United States Patent
Rawlinson et al.

(10) Patent No.: US 9,463,715 B1
(45) Date of Patent: Oct. 11, 2016

(54) METHOD OF OPERATING A MULTI-POSITION VEHICLE SEAT

(71) Applicant: Atieva, Inc., Menlo Park, CA (US)

(72) Inventors: Peter Dore Rawlinson, Worcestershire (GB); Daniel Jefferson Muir, San Carlos, CA (US)

(73) Assignee: ATIEVA, INC., Menlo Park, CA (US)

( * ) Notice: Subject to any disclaimer, the term of this patent is extended or adjusted under 35 U.S.C. 154(b) by 0 days.

(21) Appl. No.: 14/706,014

(22) Filed: May 7, 2015

Related U.S. Application Data

(63) Continuation-in-part of application No. 14/706,008, filed on May 7, 2015.

(51) Int. Cl.
*B60N 2/02* (2006.01)
*B60N 2/06* (2006.01)
*B60N 2/14* (2006.01)

(52) U.S. Cl.
CPC .......... *B60N 2/0244* (2013.01); *B60N 2/0228* (2013.01); *B60N 2/06* (2013.01); *B60N 2/062* (2013.01); *B60N 2/14* (2013.01); *B60N 2002/022* (2013.01); *B60N 2002/0216* (2013.01); *B60N 2002/0272* (2013.01)

(58) Field of Classification Search
CPC .... B60N 2/02; B60N 2/0224; B60N 2/0228; B60N 2/0232; B60N 2/0244; B60N 2/0296; B60N 2/04; B60N 2/06; B60N 2/062; B60N 2/065; B60N 2/067; B60N 2/07; B60N 2/14
USPC .......... 296/65.07, 65.08, 65.12, 65.13, 65.15
See application file for complete search history.

(56) References Cited

U.S. PATENT DOCUMENTS

| | | | |
|---|---|---|---|
| 4,846,529 | A | 7/1989 | Tulley |
| 4,997,053 | A | 3/1991 | Drori |
| 8,182,014 | B2 | 5/2012 | Mabuchi |
| 8,245,994 | B2 | 8/2012 | Yamada |
| 9,114,733 | B2 | 8/2015 | Pluta |
| 2007/0290554 | A1 | 12/2007 | Teshima |
| 2008/0312797 | A1 | 12/2008 | Takehisa |
| 2014/0138997 | A1 | 5/2014 | Schulz |

*Primary Examiner* — Jason S Daniels
(74) *Attorney, Agent, or Firm* — Patent Law Office of David G. Beck

(57) ABSTRACT

A method of positioning a vehicle seat is provided that allows a vehicle passenger seat, preferably a rear passenger seat mounted within the rear portion of the passenger cabin, to move laterally (i.e., side-to-side), fore-aft (i.e., forwards-backwards), and rotationally. As a result, an occupant of the passenger seat can optimize their seat position for the task at hand, e.g., relaxing, obtaining additional leg and/or shoulder room, rotating inwards during a conversation with others in the car, rotating outwards to aid vehicle egress, etc.

21 Claims, 9 Drawing Sheets

METHOD OF OPERATING A MULTI-POSITION VEHICLE SEAT

CROSS-REFERENCE TO RELATED APPLICATION

This application is a continuation-in-part of U.S. patent application Ser. No. 14/706,008, filed 7 May 2015, the disclosure of which is incorporated herein by reference for any and all purposes.

FIELD OF THE INVENTION

The present invention relates generally to a vehicle and, more particularly, to a system and method that allows a car seat to be configured in a variety of positions.

BACKGROUND OF THE INVENTION

Luxury vehicles offer a number of user amenities that provide both the driver and the passengers with a more enriching experience; one which attempts to accommodate the particular wants and needs of each of the car's occupants. For example, many cars allow the driver to select between multiple driving modes by simply rotating a knob or pushing a button, where each driving mode alters a variety of vehicle characteristics ranging from throttle response to suspension set-up. Commonly used driving modes include normal, economy and sport. Another feature that has become commonplace among luxury vehicles is the ability to preset and memorize the various aspects of the driver's seat, e.g., seat position, seat height, seatback incline, lumbar support, seat cushion angle and seat cushion length. Once preset, recorded in memory and assigned to a particular user, the preset settings may be re-obtained by simply pushing a button within the car or activating the car with a user assigned key fob. Outside minors and steering wheel position may also be linked to the same memory, thus allowing the vehicle to automatically adjust the driver's seat, steering wheel and mirror placement once a particular driver is identified.

In addition to providing the driver with a more engaging experience that may be customized to enhance performance, ergonomics, comfort, safety and/or convenience, many luxury vehicles also try to cater to the desires of the vehicle's passengers. For example, luxury vehicles often provide rear seat passengers with separate rear compartment heating and ventilation controls that may include individual seat heaters as well as individually controllable fans and vents. Additionally, such vehicles often provide electric window shades and a rear compartment audio-video system that may include a video game player, a DVD player, an MP3 player, wired/wireless headphone connections, etc. Unfortunately, the rear seats in most luxury vehicles are only distinguishable from a those in a conventional car based on material selection and seat padding. Accordingly, while the features incorporated into many luxury vehicles provide the passengers a relaxed and enjoyable setting, further improvements in seating comfort and versatility are desired so that the occupants seated in the rear portion of the passenger cabin can more easily converse and enjoy the ride. Accordingly, the present invention provides a multipurpose and comfortable seating system for the rear passenger compartment.

SUMMARY OF THE INVENTION

The present invention provides a method of positioning a vehicle seat, comprising (i) monitoring a seat position selector, where the seat position selector is configured to accept selection of a particular seat position from a plurality of available seat positions; (ii) detecting selection of the particular seat position; and (iii) automatically moving the vehicle seat from a current seat position to the particular seat position after completion of the detecting step, where the step of automatically moving the vehicle seat is performed by a controller and a drive system coupled to the vehicle seat via a seat positioning system, and where the seat positioning system is configured to provide repositioning of the vehicle seat via the drive system in forward and backward directions within a first range of motion, in lateral-left and lateral-right directions within a second range of motion, and in clockwise rotational and counter-clockwise rotational directions within a third range of motion.

In one aspect, the seat position selector may be comprised of at least one multi-positional switch and the step of detecting selection of the particular seat position may further comprise the step of determining the direction of movement of the at least one multi-positional switch, where the direction of movement is selected from a plurality of available switch movement directions each of which corresponds to a preset direction of motion of the vehicle seat via the seat positioning system. The step of determining the direction of movement of the at least one multi-positional switch may further include one or more of the steps of: (i) determining if the direction of movement is in a first direction corresponding to movement of the vehicle seat in the forward direction; (ii) determining if the direction of movement is in a second direction corresponding to movement of the vehicle seat in the backwards direction; (iii) determining if the direction of movement is in a third direction corresponding to movement of the vehicle seat in the lateral-left direction; (iv) determining if the direction of movement is in a fourth direction corresponding to movement of the vehicle seat in the lateral-right direction; (v) determining if the direction of movement is in a fifth direction corresponding to movement of the vehicle seat in the clockwise rotational direction; (vi) determining if the direction of movement is in a sixth direction corresponding to movement of the vehicle seat in the counter-clockwise rotational direction.

In another aspect, the seat position selector may be comprised of a plurality of switches that correspond to a plurality of seat movement directions, where a first switch of the plurality of switches corresponds to the forward direction, where a second switch of the plurality of switches corresponds to the backward direction, where a third switch of the plurality of switches corresponds to the lateral-left direction, where a fourth switch of the plurality of switches corresponds to the lateral-right direction, where a fifth switch of the plurality of switches corresponds to the clockwise rotational direction, and where a sixth switch of the plurality of switches corresponds to the counter-clockwise rotational direction. The step of detecting selection of the particular seat position may further comprise the steps of determining when a particular switch of the plurality of switches is activated and identifying the particular switch from the plurality of switches. The step of automatically moving the vehicle seat may further comprise the steps of determining the particular seat movement direction that corresponds to the particular switch and then moving the vehicle seat in the particular seat movement direction. The method may further include the steps of determining when the particular switch is deactivated and then terminating the step of moving the vehicle seat.

In another aspect, the seat position selector may be comprised of a plurality of switches that correspond to a plurality of preset vehicle seat positions. The step of detecting selection of the particular seat position may further comprise the steps of determining when a particular switch of the plurality of switches is activated and identifying the particular switch from the plurality of switches. The step of automatically moving the vehicle seat may further comprise the steps of determining the particular preset vehicle seat position that corresponds to the particular switch and then moving the vehicle seat from the current seat position to the particular preset vehicle seat position.

In another aspect, the method may include the steps of monitoring a vehicle speed sensor, comparing the current vehicle speed to a preset vehicle speed, and automatically moving the vehicle seat from the current seat position to a preset seat position when the current vehicle speed exceeds the preset vehicle speed.

In another aspect, the method may include the steps of monitoring a door handle sensor coupled to an internal and/or external door handle, detecting when the vehicle door handle is touched, and automatically moving the vehicle seat from the current seat position to a preset seat position (e.g., vehicle seat entrance/egress position) when the door handle is touched.

In another aspect, the method may include the steps of monitoring a door handle sensor coupled to an internal and/or external door handle, detecting when the vehicle door handle is activated, and automatically moving the vehicle seat from the current seat position to a preset seat position (e.g., vehicle seat entrance/egress position) when the door handle is activated.

In another aspect, the method may include the steps of monitoring a door lock sensor coupled to a vehicle door, determining when the vehicle door is unlocked based on output from the door lock sensor, and automatically moving the vehicle seat from the current seat position to a preset seat position (e.g., vehicle seat entrance/egress position) when the vehicle door is unlocked.

In another aspect, the method may include the steps of monitoring a vehicle drive system, determining when the vehicle is placed into a park configuration, and automatically moving the vehicle seat from the current seat position to a preset seat position (e.g., vehicle seat entrance/egress position) when the vehicle is placed into the park configuration.

In another aspect, the method may include the steps of monitoring a vehicle status sensor that indicates a vehicle on status and a vehicle off status, determining when the vehicle status sensor indicates a change from the vehicle on status to the vehicle off status, and automatically moving the vehicle seat from the current seat position to a preset seat position (e.g., vehicle seat entrance/egress position) when the vehicle status sensor indicates the change from the vehicle on status to the vehicle off status. The method may further include the steps of determining when the vehicle status sensor indicates a second change from the vehicle off status to the vehicle on status, and automatically moving the vehicle seat from the vehicle seat entrance/egress position to a normal driving seat position when the vehicle status sensor indicates the second change from the vehicle off status to the vehicle on status.

A further understanding of the nature and advantages of the present invention may be realized by reference to the remaining portions of the specification and the drawings.

BRIEF DESCRIPTION OF THE DRAWINGS

It should be understood that the accompanying figures are only meant to illustrate, not limit, the scope of the invention and should not be considered to be to scale. Additionally, the same reference label on different figures should be understood to refer to the same component or a component of similar functionality.

DESCRIPTION OF THE SPECIFIC EMBODIMENTS

As used herein, the singular forms "a", "an" and "the" are intended to include the plural forms as well, unless the context clearly indicates otherwise. The terms "comprises", "comprising", "includes", and/or "including", as used herein, specify the presence of stated features, process steps, operations, elements, and/or components, but do not preclude the presence or addition of one or more other features, process steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps, calculations, or components, these steps, calculations, or components should not be limited by these terms, rather these terms are only used to distinguish one step, calculation, or component from another. For example, a first calculation could be termed a second calculation, and, similarly, a first step could be termed a second step, and, similarly, a first component could be termed a second component, without departing from the scope of this disclosure.

As described in detail below, the present invention provides a seat mounting system that allows a vehicle passenger seat, preferably a rear passenger seat mounted within the rear portion of the passenger cabin, to move laterally (i.e., side-to-side), fore-aft (i.e., forwards-backwards), and rotationally. As a result, an occupant of the passenger seat can optimize their seat position for the task at hand, e.g., relaxing, obtaining additional leg and/or shoulder room, rotating inwards during a conversation with others in the car, rotating outwards to aid vehicle egress, etc. In the preferred embodiment, seat movement is accomplished via automated track assemblies. It should be understood, however, that the seat mounting system of the invention may also be used in a manual configuration, i.e., with manually operated track assemblies.

Figure 1:
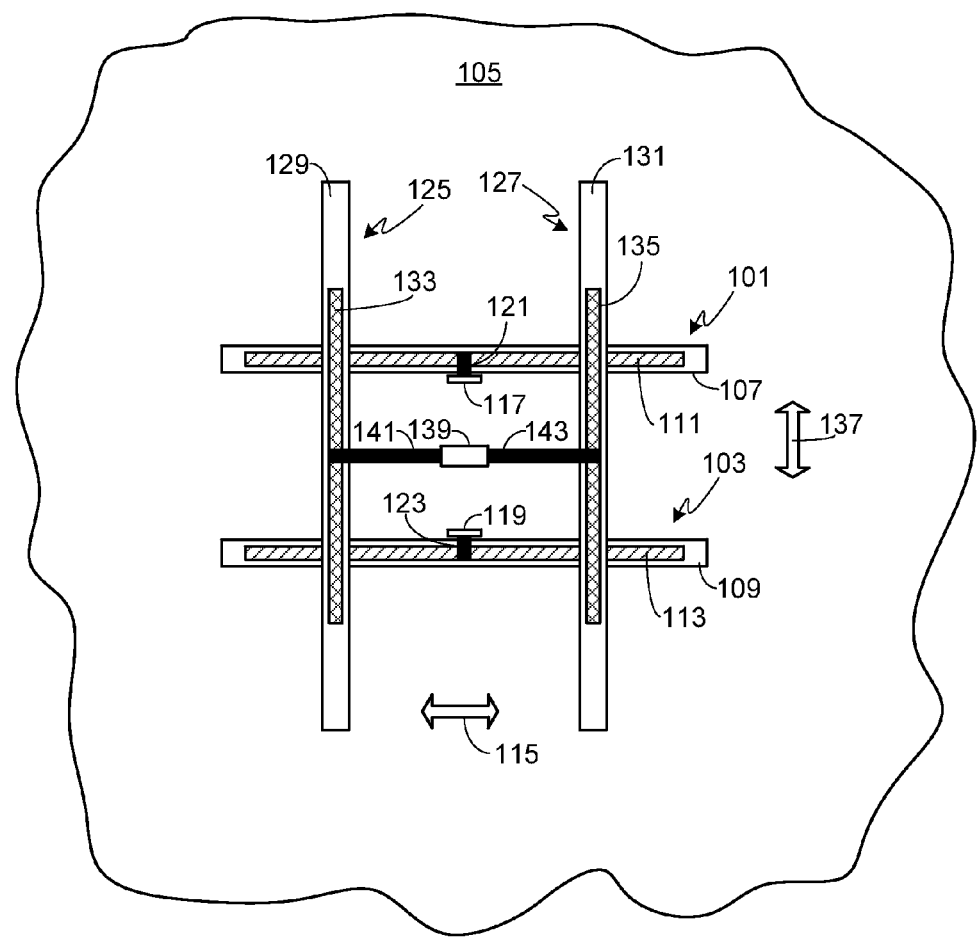
FIG. 1 provides a top view of a dual track system that is used with at least one embodiment of the invention.

FIG. 1 provides a top view of a dual track system that is used with at least one embodiment of the invention. The first pair of track assemblies, which includes assemblies 101 and 103, is mounted to a vehicle structure such as the vehicle's floor 105. In a typical configuration, means such as a plurality of bolts are used to attach the track assemblies 101/103 to floor 105, and preferably to floor 105 as well as an underlying and/or integral vehicle structure (e.g., a vehicle frame member). In at least one embodiment the bolts used to mount the first set of track assemblies pass through floor panel 105 and are bolted to an underlying battery pack enclosure. It should be understood that the seat mounting system may be attached to any of a variety of vehicle structures as long as the selected structure is sufficiently strong to insure that seat movement during a car collision remains within acceptable limits.

Each track assembly 101 and 103 includes a fixed track member 107 and 109, respectively, and a rail member 111 and 113, respectively, where the rail members are designed to slide within the corresponding fixed track member. When mounted within the car, rails 111 and 113 move laterally as indicated in the figure by reference 115. As noted previously, although the system can be configured to be manually operable, preferably it is automated. Accordingly, in the illustrated embodiment track assembly 101 is coupled to drive unit 117 and track assembly 103 is coupled to drive unit 119. Preferably drive units 117 and 119 are electro-mechanical motors, although it will be appreciated that other types of drive units may be used (e.g., hydraulic drives). In the illustrated embodiment, drive shaft 121 of drive unit 117 is coupled to track assembly 101 using a rack and pinion actuator. Similarly, drive shaft 123 of drive unit 119 is coupled to track assembly 103 using a rack and pinion actuator.

A second pair of track assemblies, comprised of assemblies 125 and 127, is mounted to the first pair of track assemblies. As with the first pair of assemblies, each track assembly 125 and 127 includes a fixed track member 129 and 131, respectively, and a rail member 133 and 135, respectively, where the rail members are designed to slide within the corresponding fixed track member. When mounted, track assemblies 125 and 127 provide substantially fore-aft movement as indicated in the figure by reference 137. As with the first pair of track assemblies, while manual operation is permissible, preferably automated operation is used. In the preferred embodiment, a single drive unit 139 (e.g., electro-mechanical or hydraulic drive) is used to position rails 133 and 135 relative to the corresponding track members 129 and 131, respectively. In the illustrated embodiment, drive unit 139 includes a first drive shaft 141 coupled to track assembly 129 via a first rack and pinion actuator and a second drive shaft 143 coupled to track assembly 131 via a second rack and pinion actuator. While actuation of both track assemblies 129 and 131 is preferred in order to insure smooth seat movement, in an alternate configuration drive unit 139 is only coupled to one of the track assemblies. As rail members 133 and 135 are rigidly tied together via the seat as described below, in this configuration the non-driven track assembly is free to move and as a result, simply follows the driven track assembly.

Figure 2:
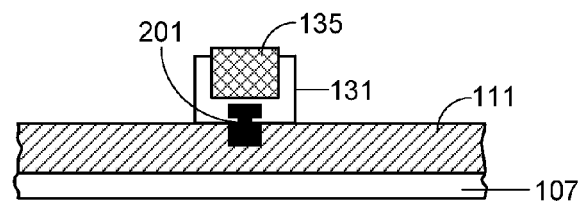
FIG. 2 illustrates the coupling between the fore/aft and lateral track assemblies of the dual track system shown in FIG. 1.

The mounting between the upper pair of track assemblies 125/127 and the lower pair of track assemblies 101/103 is illustrated in FIG. 2. This figure provides a cross-sectional view of a portion of the dual track system described above. As shown, an upper track member (e.g., member 131) is pinned to lower rail member (e.g., member 111) via a pin 201. Pin 201 allows an upper track member to rotate relative to a lower rail member. Additionally and as illustrated in FIG. 3, the upper track member may be slotted in order to provide the desired range of motion as described in detail below.

Figure 3:
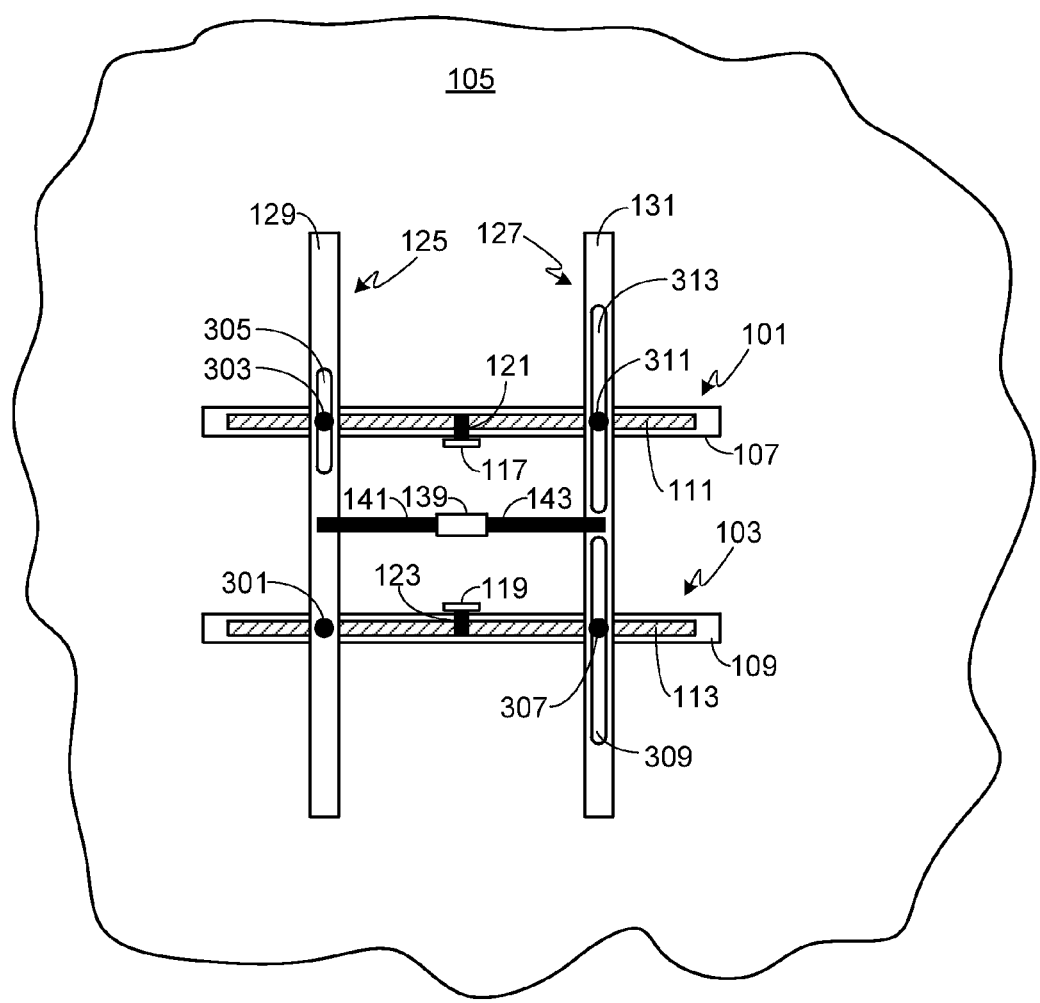
FIG. 3 provides the same view of the dual track system as shown in FIG. 1, modified to exclude the upper rail members so that the upper track assembly mounting pins are visible.

FIG. 3 illustrates the assembly shown in FIG. 1 with upper rails 133 and 135 removed for clarity. As shown, pin 301 only allows upper track member 129 to rotate about rail 113 at the point at which the two are pinned together. In contrast, pin 303 allows upper track member 129 to rotate about rail 111 and to slide within slot 305. Similarly, pin 307 allows upper track member 131 to rotate about rail 113 and to slide within slot 309, and pin 311 allows upper track member 131 to rotate about rail 111 and to slide within slot 313.

Figure 4:
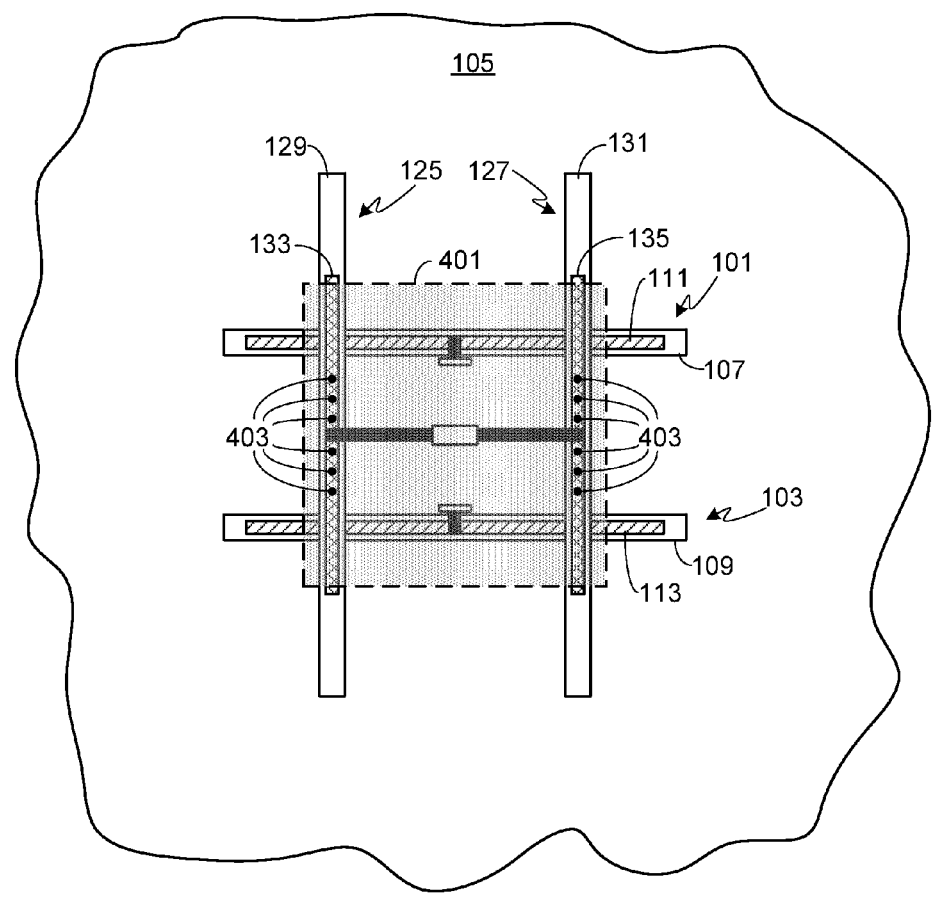
FIG. 4 provides the same view of the dual track system as shown in FIG. 1, modified to illustrate the mounting of the seat to the upper set of rail members.

The vehicle seat is rigidly attached to upper rails 133 and 135, for example via bolts, welding, brazing or other means. FIG. 4 illustrates the dual track assembly shown in the previous figures with a vehicle seat 401 mounted to upper rails 133 and 135 via a plurality of bolts 403. It should be understood that other techniques such as welding or brazing may be used to attach vehicle seat 401 to rails 133/135. Note that in FIG. 4 only the outer envelope of vehicle seat 401 is shown (in phantom), thus allowing mounting bolts 403 to be visible as well as the underlying dual track system.

Figure 5:
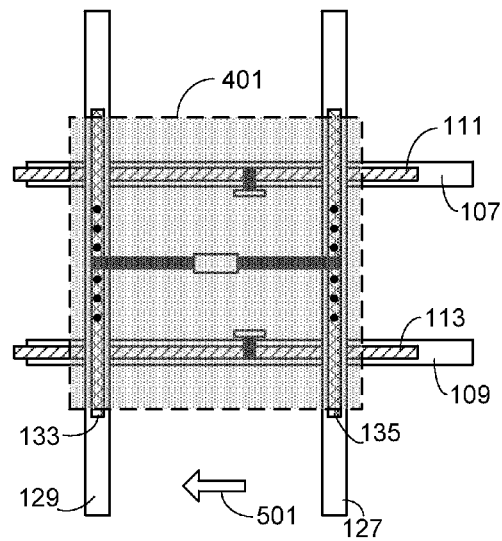
FIG. 5 provides the same view of the dual track system as shown in FIG. 1, modified to illustrate lateral movement of a vehicle seat.
Figure 6:
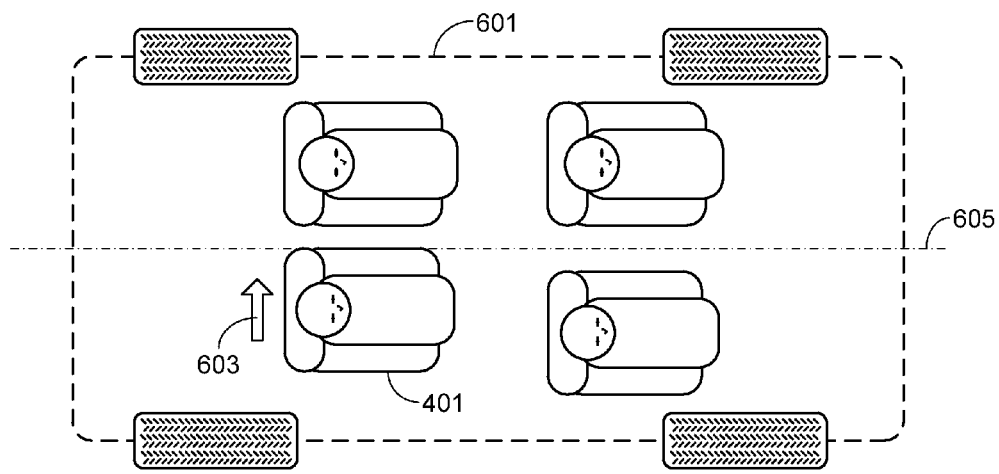
FIG. 6 provides a top view of a vehicle's passenger cabin in which the right rear passenger seat has been moved laterally toward the vehicle's centerline.

FIGS. 5-12 illustrate the dual track system of the invention with the seat shown in a variety of positions. In FIG. 5, seat 401 has been moved laterally to the left by uniformly adjusting rails 111 and 113 to the left, as represented by directional arrow 501. This repositioning of seat 401 is illustrated in FIG. 6 which shows a top view of the passenger cabin of a vehicle 601. In vehicle 601, seat 401 is the right back seat. As shown in FIG. 6, moving seat 401 laterally to the left by adjusting rails 111 and 113 in direction 603 moves the seat towards the vehicle's centerline 605. In the preferred embodiment, seat 401 may also be moved laterally to the right, towards the right side of the car, by adjusting rails 111 and 113 to the right (i.e., in a direction that is the opposite of direction 501 in FIG. 5).

Figure 7:
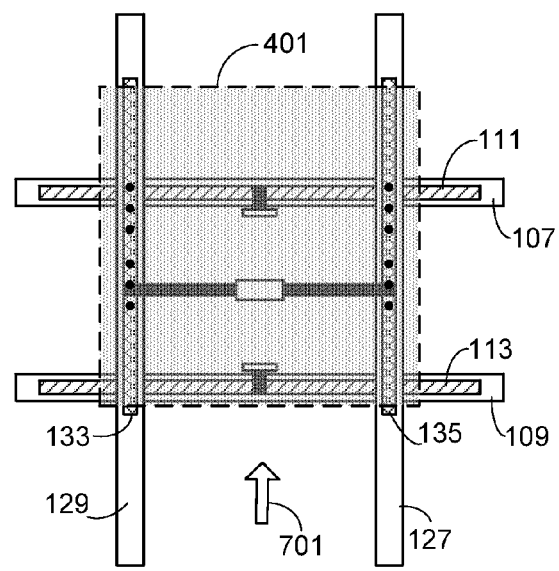
FIG. 7 provides the same view of the dual track system as shown in FIG. 1, modified to illustrate forward movement of a vehicle seat.
Figure 8:
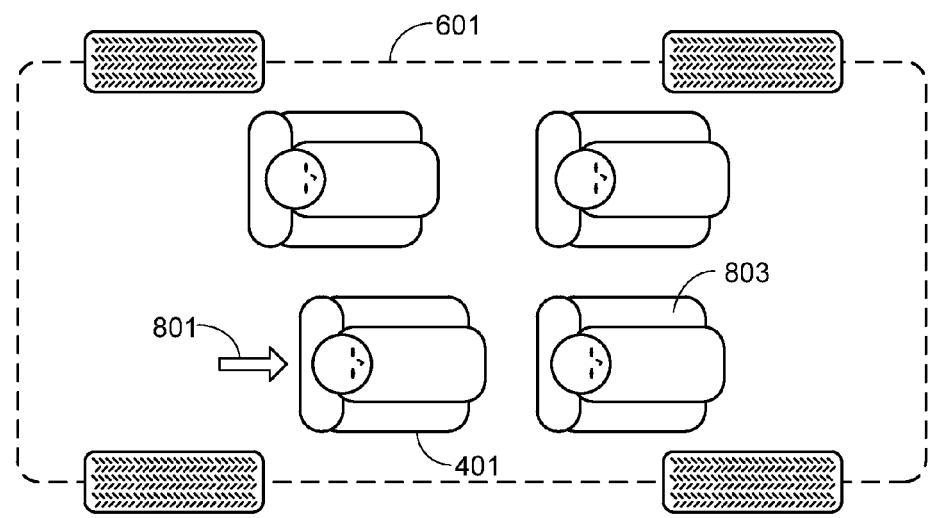
FIG. 8 provides a top view of a vehicle's passenger cabin in which the right rear passenger seat has been moved forward.
Figure 9:
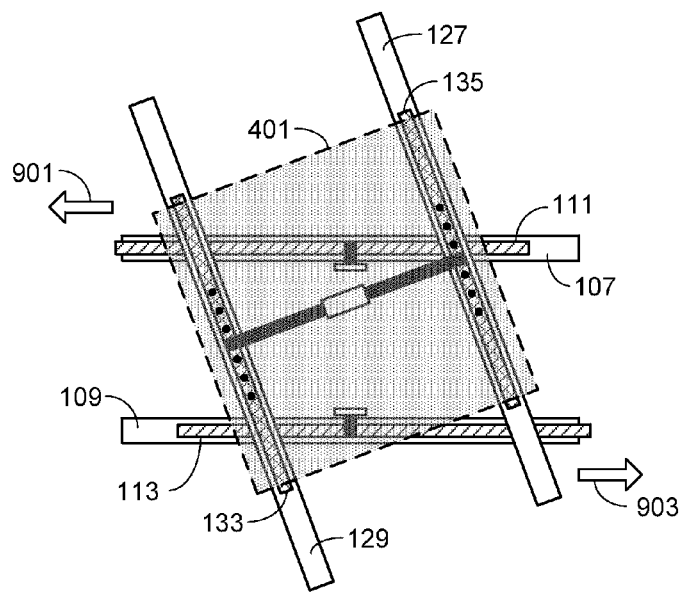
FIG. 9 provides the same view of the dual track system as shown in FIG. 1, modified to illustrate rotational movement of a vehicle seat.

In FIG. 7, seat 401 has been moved forward in a direction 701 by uniformly moving rails 133 and 135 forward. As illustrated in the corresponding seat arrangement shown in FIG. 8, as a result of moving rails 133 and 135 forward in a direction 801, seat 401 has been moved closer to front passenger seat 803. Moving seat 401 forward, as shown, provides additional room behind the seat that may be used for storage or to provide additional space for reclining the back of seat 401. Preferably seat 401 may also be moved backwards by moving rails 133 and 135 to the rear, i.e., in a direction that is the opposite of direction 701 in FIG. 7, thus providing additional leg room in front of the seat.

Figure 10:
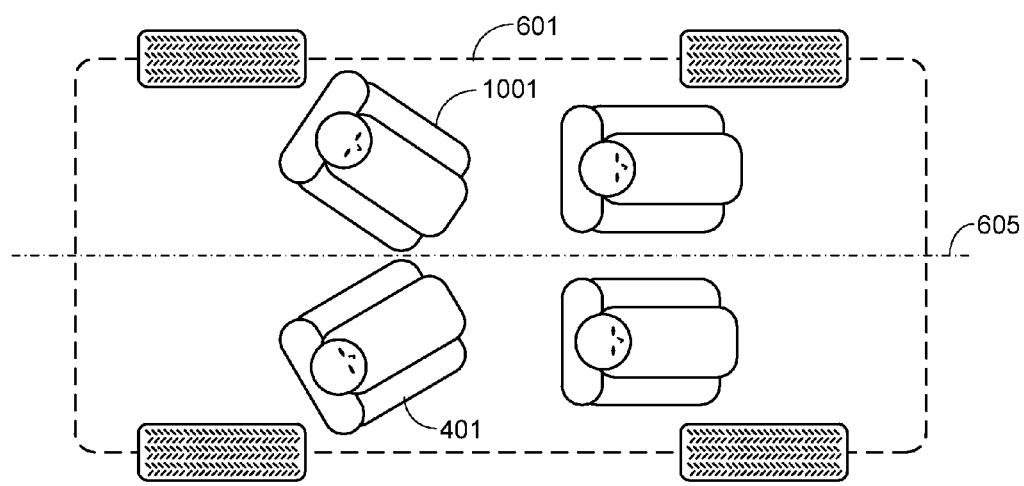
FIG. 10 provides a top view of a vehicle's passenger cabin in which both rear passenger seats have been rotated inwards towards the vehicle's centerline.
Figure 11:
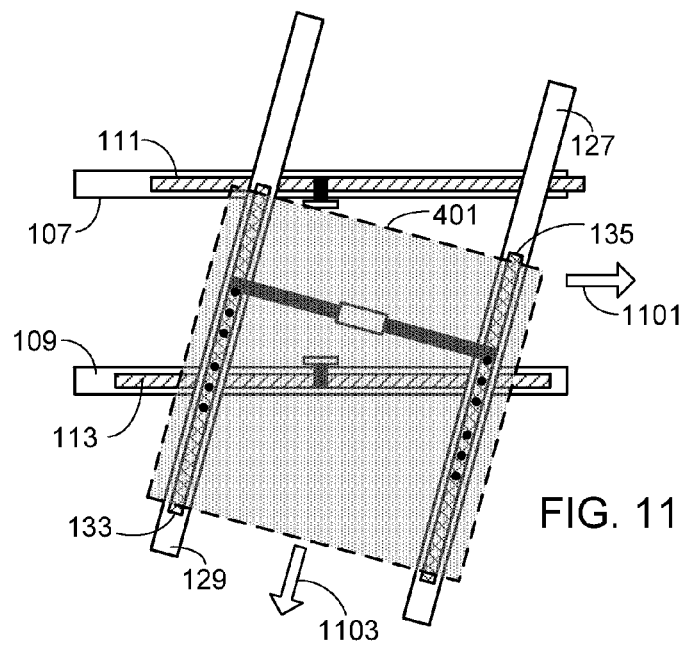
FIG. 11 provides the same view of the dual track system as shown in FIG. 1, modified to illustrate a vehicle chair that has been rotated outwardly and moved laterally right and backwards.

In addition to lateral and fore-aft seat movement, the dual tracking system in combination with the separate drive units coupled to rails 111 and 113 provide another degree of motion for chair 401, specifically seat rotation. Vehicle seat rotation is achieved by moving rails 111 and 113 non-uniformly, i.e., by moving rails 111 and 113 in opposite directions from one another, or by moving one of these rails while holding the remaining rail stationary, or by moving both rails 111 and 113 in the same direction but by different amounts. In the illustrated example shown in FIGS. 9 and 10, rail 111 is moved laterally left in a direction 901 and rail 113 is moved laterally right in a direction 903. As a result, vehicle seat 401 is rotated towards vehicle centerline 605 as illustrated in FIG. 10. To better illustrate some of the benefits of the present invention, in FIG. 10 the second rear vehicle seat, seat 1001, has also been rotated towards vehicle centerline 605. As a result of this seating arrangement, occupants seated in the rear portion of the passenger compartment can more easily carry on a face-to-face conversation.

Figure 12:
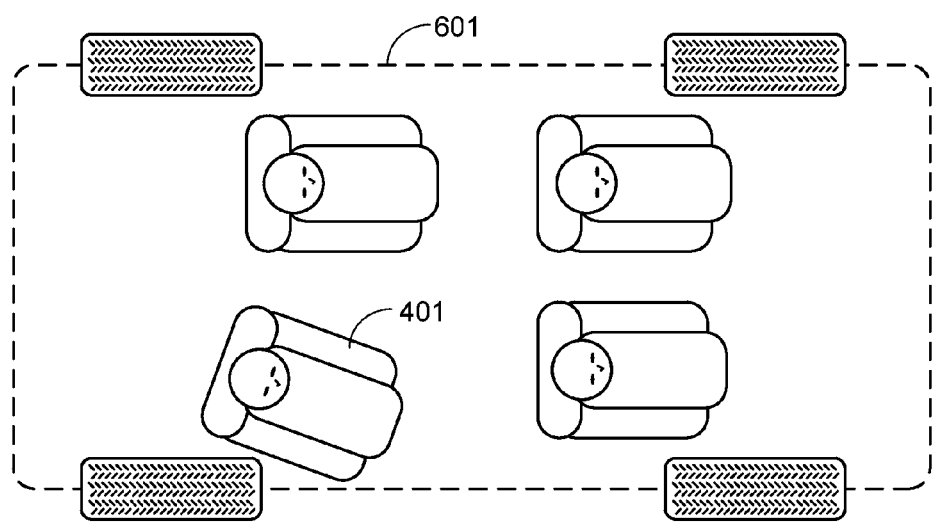
FIG. 12 provides a top view of a vehicle's passenger cabin in which the right rear passenger seat has been rotated outwardly and moved laterally right and backwards.

It should be understood that rotation of a vehicle seat does not prevent the dual tracking system of the present invention from providing fore-aft and/or lateral motion of the vehicle seat. For example, in FIG. 11 vehicle seat 401 is rotated outwardly, laterally right, and backwards, thus allowing easy egress from vehicle 601. In this example both rails 111 and 113 are moved laterally right in a direction 1101, although rail 111 has been moved further right. As a result, seat 401 is moved right as well as rotated outwards towards the side of the car. Additionally, rails 133 and 135 are moved backwards in a direction 1103, thus causing backwards seat motion. This seat arrangement is illustrated in FIG. 12.

Figure 13:
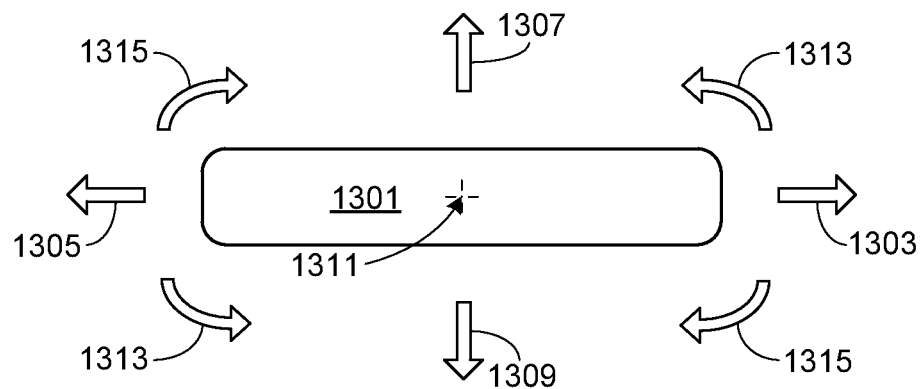
FIG. 13 illustrates an exemplary multi-positional switch that may be used to control all motions of vehicle seat coupled to the seat positioning system of the invention.

As described above, preferably the dual track system of the invention is powered, for example by a set of electro-mechanical or hydraulic drive units, thus simplifying seat positioning. In one embodiment, one or more seat positioning switches are mounted on the side of the seat, within easy reach of the seat's occupant. In an alternate embodiment, the seat positioning switch or switches are located within the passenger cabin, for example on the door next to the seat that is controlled by the switches. FIG. 13 illustrates an exemplary multi-positional switch 1301 that can be used to control all motions of vehicle seat 401, and that can be mounted on the side of the chair or elsewhere within the passenger cabin. Moving switch 1301 in a direction 1303 causes forward motion of vehicle seat 401; moving switch 1301 in a direction 1305 causes rearward motion of vehicle seat 401; moving switch 1301 in a direction 1307 causes vehicle seat 401 to move laterally to the left; moving switch 1301 in a direction 1309 causes vehicle seat 401 to move laterally to the right; rotating switch 1301 clockwise about axis 1311 in a direction 1313 causes vehicle seat 401 to rotate clockwise; and rotating switch 1301 counter-clockwise about axis 1311 in a direction 1315 causes vehicle seat 401 to rotate counter-clockwise. It should be understood that switch 1301 only illustrates one possible configuration for a seat positioning switch, and that the inventor envisions other configurations such as the use of multiple switches, touch-sensitive switches displayed on a touch-panel adjacent to vehicle seat 401, etc.

Figure 14:
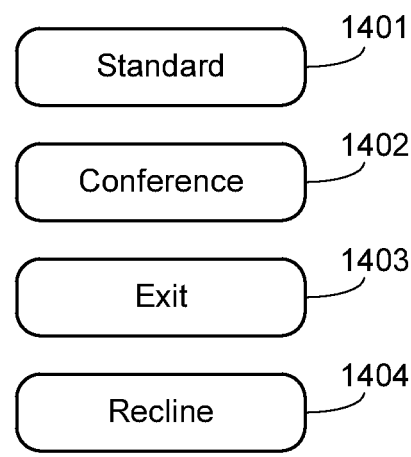
FIG. 14 illustrates a plurality of switches, each of which corresponds to a pre-programmed seat position.

In at least one embodiment a seat control system, coupled to the seat drive units (e.g., drive units 117, 119 and 139), is pre-programmed with multiple seat positions. Preferably a plurality of switches, e.g., mechanical switches or touch-sensitive switches on a display unit, correspond to each of these pre-programmed seat positions, thereby simplifying selection of a particular position. FIG. 14 illustrates a set of seat position selection switches 1401-1404 that correspond to an exemplary set of pre-programmed seat positions. In the illustrated set of position selection switches, switch 1401 corresponds to a "Standard" position. The standard position may be one in which leg room is optimized and the seat is centered between the adjacent door and the vehicle's centerline. Switch 1402 corresponds to a "Conference" position, i.e., one in which the affected seat is rotated inwardly towards the center of the car, thus facilitating face-to-face discussions. Switch 1403 corresponds to an "Exit" position, i.e., one in which the affected seat is moved backwards and rotated outwardly, thereby providing easy egress from the vehicle. Switch 1404 corresponds to a "Recline" position. In this position the vehicle seat is moved in order to facilitate seat recline, for example by moving the chair slightly forward. Assuming a power recline feature, this switch may also automatically recline the seat. Preferably the seat position selection switches are mounted in a convenient location for easy access by one or both of the occupants of the rear portion of the passenger compartment; alternately, the seat position selection switches, or a secondary set of seat position selection switches, may be accessible to the driver of the car. In the preferred embodiment, the seat position selection switches only affect a single seat. In an alternate embodiment, one or more of the seat position selection switches affect both of the rear vehicle seats. For example, pressing or otherwise activating conference switch 1402 may cause both rear vehicle seats to rotate inwardly towards the center of the car, thus creating more of a conference room setting. Similarly, the exit switch 1403 may move both rear seats to the exit position.

In at least one embodiment of the invention, at least some of the control of the dual track seat positioning system is fully automated. For example, the seat control system may be programmed to optimize seat(s) position for vehicle entrance/egress when the controller determines that someone is likely to enter or exit the vehicle. Some of the conditions that may be monitored in order to make such a determination include (i) monitoring when the internal door handle is touched; (ii) monitoring when the internal door handle is in use, i.e., activated; (iii) monitoring when the external door handle is touched; (iv) monitoring when the external door handle is in use, i.e., activated; (v) monitoring when the car doors are unlocked; (vi) monitoring when the car is placed in park; (vii) monitoring when the parking brake is activated and/or deactivated; and/or (viii) monitoring when the car is turned on or turned off. A fully automated seat control system may also be configured to return the seat(s) to the "standard" position under certain conditions, such as when the vehicle speed exceeds a preset speed.

Figure 15:
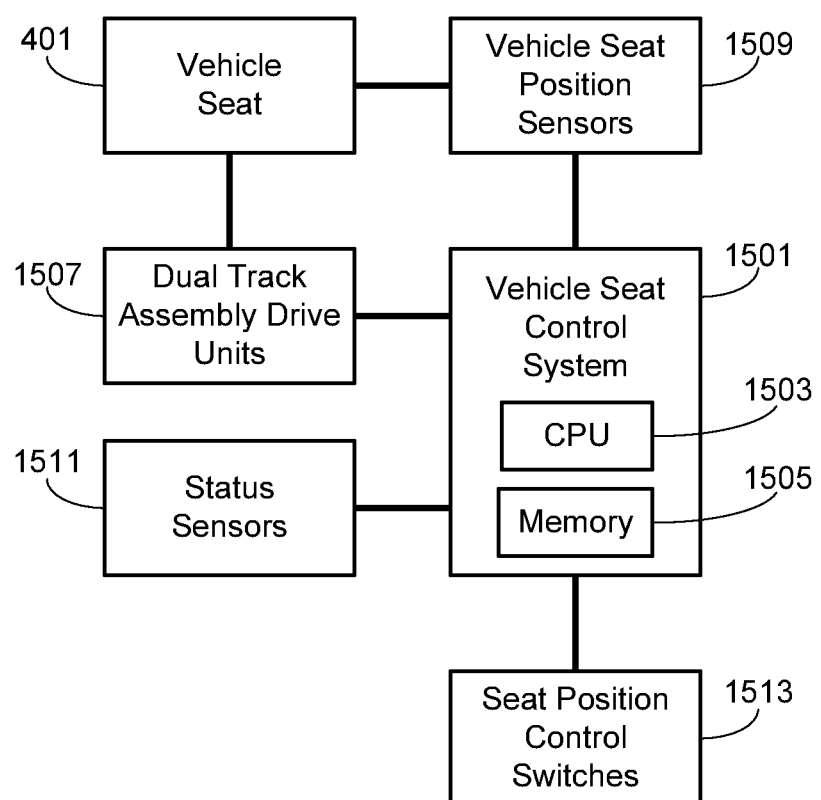
FIG. 15 provides a system level diagram of an exemplary control system for use with the dual track seat positioning system of the invention

FIG. 15 is a high-level view of some of the primary vehicle systems which may be used to control the dual track seat positioning system of the invention. The system includes a vehicle seat control system 1501, also referred to herein as a seat controller. Seat controller 1501, which includes a control processor, may be a dedicated control system or integrated into another vehicle control system, for example a vehicle management system. Controller 1501 includes a central processing unit (CPU) 1503 and a memory 1505, with memory 1505 being comprised of EPROM, EEPROM, flash memory, RAM, solid state drive, hard disk drive, or any other type of memory or combination of memory types. Memory 1505 may be used to store pre-set seat positions such as a preferred conference position, a vehicle entrance/egress position, etc.

Coupled to vehicle seat control system 1501 is the seat positioning system 1507, where the positioning system includes the drive units coupled to the dual track assemblies (e.g., drive units 117, 119 and 139). Vehicle seat 401 is coupled to the seat positioning system 1507 and to seat position sensors 1509. Sensors 1509 may directly monitor seat position. Alternately, sensors 1509 may simply represent the feedback provided by the drive units which, once calibrated, can be used to accurately determine seat position. Preferably coupled to vehicle seat controller 1501 are a variety of sensors 1511 that may be used to monitor various vehicle subsystems in order to determine specific vehicle conditions such as vehicle speed, whether or not the vehicle is turned on (i.e., activated) or turned off (i.e., deactivated), whether the vehicle is in park and/or gear (e.g., drive), whether or not the doors are locked, whether an internal door handle is being touched or activated, whether an external door handle is being touched or activated, etc. As described above, control system 1501 may be configured to automatically position vehicle seat 401 using data acquired through sensors 1511. Seat position control switches 1513 are also coupled to controller 1501, where the switches may be configured to simply move the seat in the selected direction as described above relative to FIG. 13, or may be configured to move the seat to a pre-selected position as described above relative to FIG. 14.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A method of positioning a vehicle seat, comprising:
monitoring a seat position selector, wherein said seat position selector is configured to accept selection of a particular seat position for said vehicle seat from a plurality of available seat positions;
detecting selection of said particular seat position from said plurality of available seat positions;
automatically moving said vehicle seat from a current seat position to said particular seat position after completion of said detecting step, wherein said step of automatically moving said vehicle seat is performed by a controller and a drive system coupled to said vehicle seat via a seat positioning system, wherein said seat positioning system is configured to provide repositioning of said vehicle seat via said drive system in a forward direction and a backward direction within a first range of motion, wherein said drive system is configured to provide repositioning of said vehicle seat via said drive system in a lateral-left direction and lateral-right direction within a second range of motion, and wherein said drive system is configured to provide repositioning of said vehicle seat via said drive system in a clockwise rotational direction and a counter-clockwise rotational direction within a third range of motion;
monitoring a vehicle speed sensor; and
comparing a current vehicle speed to a preset vehicle speed, wherein said step of automatically moving said vehicle seat further comprises automatically moving said vehicle seat from said current seat position to a preset seat position when said current vehicle speed exceeds said preset vehicle speed.

2. The method of claim 1, wherein said seat position selector is comprised of at least one multi-positional switch, wherein said step of detecting selection of said particular seat position further comprises determining a direction of movement of said at least one multi-positional switch, wherein said direction of movement is selected from a plurality of available switch movement directions, and wherein each of said plurality of available switch movement directions corresponds to a preset direction of motion of said vehicle seat via said seat positioning system.

3. The method of claim 2, wherein said step of determining said direction of movement of said at least one multi-positional switch further comprises determining if said direction of movement is in a first direction, wherein said first direction is selected from said plurality of available switch movement directions, and wherein said first direction corresponds to movement of said vehicle seat in said forward direction, wherein said step of determining said direction of movement of said at least one multi-positional switch further comprises determining if said direction of movement is in a second direction, wherein said second direction is selected from said plurality of available switch movement directions, and wherein said second direction corresponds to movement of said vehicle seat in said backwards direction.

4. The method of claim 2, wherein said step of determining said direction of movement of said at least one multi-positional switch further comprises determining if said direction of movement is in a third direction, wherein said third direction is selected from said plurality of available switch movement directions, and wherein said third direction corresponds to movement of said vehicle seat in said lateral-left direction, wherein said step of determining said direction of movement of said at least one multi-positional switch further comprises determining if said direction of movement is in a fourth direction, wherein said fourth direction is selected from said plurality of available switch movement directions, and wherein said fourth direction corresponds to movement of said vehicle seat in said lateral-right direction.

5. The method of claim 2, wherein said step of determining said direction of movement of said at least one multi-positional switch further comprises determining if said direction of movement is in a fifth direction, wherein said fifth direction is selected from said plurality of available switch movement directions, and wherein said fifth direction corresponds to movement of said vehicle seat in said clockwise rotational direction, wherein said step of determining said direction of movement of said at least one multi-positional switch further comprises determining if said direction of movement is in a sixth direction, wherein said sixth direction is selected from said plurality of available switch movement directions, and wherein said sixth direction corresponds to movement of said vehicle seat in said counter-clockwise rotational direction.

6. The method of claim 1, wherein said seat position selector is comprised of at least one multi-positional switch, wherein said step of detecting selection of said particular seat position further comprises determining a direction of movement of said at least one multi-positional switch, wherein said direction of movement is selected from a plurality of available switch movement directions, wherein each of said plurality of available switch movement directions corresponds to a preset direction of motion of said vehicle seat via said seat positioning system, wherein said step of determining said direction of movement of said at least one multi-positional switch further comprises determining if said direction of movement is in a first direction, wherein said first direction corresponds to movement of said vehicle seat in said forward direction, wherein said step of determining said direction of movement of said at least one multi-positional switch further comprises determining if said direction of movement is in a second direction, wherein said second direction corresponds to movement of said vehicle seat in said backwards direction, wherein said step of determining said direction of movement of said at least one multi-positional switch further comprises determining if said direction of movement is in a third direction, wherein said third direction corresponds to movement of said vehicle seat in said lateral-left direction, wherein said step of determining said direction of movement of said at least one multi-positional switch further comprises determining if said direction of movement is in a fourth direction, wherein said fourth direction corresponds to movement of said vehicle seat in said lateral-right direction, wherein said step of determining said direction of movement of said at least one multi-positional switch further comprises determining if said direction of movement is in a fifth direction, wherein said fifth direction corresponds to movement of said vehicle seat in said clockwise rotational direction, wherein said step of determining said direction of movement of said at least one multi-positional switch further comprises determining if said direction of movement is in a sixth direction, and wherein said sixth direction corresponds to movement of said vehicle seat in said counter-clockwise rotational direction.

7. The method of claim 1, wherein said seat position selector is comprised of a plurality of switches, wherein said plurality of switches corresponds to a plurality of seat movement directions, wherein a first switch of said plurality of switches corresponds to said forward direction, wherein a second switch of said plurality of switches corresponds to said backward direction, wherein a third switch of said plurality of switches corresponds to said lateral-left direction, wherein a fourth switch of said plurality of switches corresponds to said lateral-right direction, wherein a fifth switch of said plurality of switches corresponds to said clockwise rotational direction, and wherein a sixth switch of said plurality of switches corresponds to said counter-clockwise rotational direction.

8. The method of claim 7, wherein said step of detecting selection of said particular seat position further comprises:
determining when a particular switch of said plurality of switches is activated;
identifying said particular switch from said plurality of switches; and
wherein said step of automatically moving said vehicle seat further comprises:
determining a particular seat movement direction corresponding to said particular switch of said plurality of switches, wherein said particular seat movement direction corresponds to one of said plurality of seat movement directions; and
moving said vehicle seat in said particular seat movement direction.

9. The method of claim 8, further comprising:
determining when said particular switch of said plurality of switches is deactivated; and
terminating said step of moving said vehicle seat in said particular seat movement direction when said particular switch of said plurality of switches is deactivated.

10. The method of claim 1, wherein said seat position selector is comprised of a plurality of switches, wherein said plurality of switches corresponds to a plurality of preset vehicle seat positions, wherein said step of detecting selection of said particular seat position further comprises:
determining when a particular switch of said plurality of switches is activated;
identifying said particular switch from said plurality of switches; and
wherein said step of automatically moving said vehicle seat further comprises:
determining a particular preset vehicle seat position corresponding to said particular switch of said plurality of switches, wherein said particular preset vehicle seat position corresponds to one of said plurality of preset vehicle seat positions; and
moving said vehicle seat from said current seat position to said particular preset vehicle seat position.

11. The method of claim 1, further comprising:
monitoring a door handle sensor coupled to a vehicle door handle, wherein said vehicle door handle is selected from an internal vehicle door handle and an external vehicle door handle;
detecting when said vehicle door handle is touched; and
wherein said step of automatically moving said vehicle seat further comprises automatically moving said vehicle seat from said current seat position to a predetermined position when said vehicle door handle is touched.

12. The method of claim 11, wherein said predetermined position corresponds to a vehicle seat entrance/egress position.

13. The method of claim 1, further comprising:
monitoring a door handle sensor coupled to a vehicle door handle, wherein said vehicle door handle is selected from an internal vehicle door handle and an external vehicle door handle;
detecting when said vehicle door handle is activated; and
wherein said step of automatically moving said vehicle seat further comprises automatically moving said vehicle seat from said current seat position to a predetermined position when said vehicle door handle is activated.

14. The method of claim 13, wherein said predetermined position corresponds to a vehicle seat entrance/egress position.

15. The method of claim 1, further comprising:
monitoring a door lock sensor coupled to a vehicle door;
determining when said vehicle door is unlocked based on output from said door lock sensor; and
wherein said step of automatically moving said vehicle seat further comprises automatically moving said vehicle seat from said current seat position to a predetermined position when said vehicle door is unlocked.

16. The method of claim 15, wherein said predetermined position corresponds to a vehicle seat entrance/egress position.

17. The method of claim 1, further comprising:
monitoring a vehicle drive system;
determining when said vehicle is placed into a park configuration; and
wherein said step of automatically moving said vehicle seat further comprises automatically moving said vehicle seat from said current seat position to a predetermined position when said vehicle is placed into said park configuration.

18. The method of claim 17, wherein said predetermined position corresponds to a vehicle seat entrance/egress position.

19. The method of claim 1, further comprising:
monitoring a vehicle status sensor, wherein an output from said vehicle status sensor indicates a vehicle on status and a vehicle off status;
determining when said vehicle status sensor indicates a change from said vehicle on status to said vehicle off status; and
wherein said step of automatically moving said vehicle seat further comprises automatically moving said vehicle seat from said current seat position to a predetermined position when said vehicle status sensor indicates said change from said vehicle on status to said vehicle off status.

20. The method of claim 19, wherein said predetermined position corresponds to a vehicle seat entrance/egress position.

21. The method of claim 20, further comprising:
determining when said vehicle status sensor indicates a second change from said vehicle off status to said vehicle on status; and
wherein said step of automatically moving said vehicle seat further comprises automatically moving said vehicle seat from said vehicle seat entrance/egress position to a normal driving seat position when said vehicle status sensor indicates said second change from said vehicle off status to said vehicle on status.

* * * * *